United States Patent
De Palo et al.

(10) Patent No.: US 11,174,379 B2
(45) Date of Patent: Nov. 16, 2021

(54) COMPOSITIONS OBTAINED FROM RECYCLED POLYOLEFINS

(71) Applicant: BASELL POLIOLEFINE ITALIA S.R.L., Milan (IT)

(72) Inventors: Roberto De Palo, Ferrara (IT); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 57 days.

(21) Appl. No.: 16/758,526

(22) PCT Filed: Nov. 5, 2018

(86) PCT No.: PCT/EP2018/080090
§ 371 (c)(1),
(2) Date: Apr. 23, 2020

(87) PCT Pub. No.: WO2019/091885
PCT Pub. Date: May 16, 2019

(65) Prior Publication Data
US 2020/0339794 A1    Oct. 29, 2020

(30) Foreign Application Priority Data
Nov. 13, 2017 (EP) ..................... 17201375

(51) Int. Cl.
*C08L 23/10* (2006.01)
*C08L 23/06* (2006.01)
*C08L 23/08* (2006.01)
*C08L 23/16* (2006.01)

(52) U.S. Cl.
CPC ............... *C08L 23/10* (2013.01); *C08L 23/06* (2013.01); *C08L 23/0815* (2013.01); *C08L 23/16* (2013.01); *C08L 2203/16* (2013.01); *C08L 2205/035* (2013.01); *C08L 2207/20* (2013.01)

(58) Field of Classification Search
CPC ...... C08L 23/16; C08L 23/0815; C08L 23/06; C08L 23/12; C08L 2207/062; C08L 2207/02; C08L 23/10; C08L 2205/035
See application file for complete search history.

(56) References Cited

U.S. PATENT DOCUMENTS 6,172,172 B1 *   1/2001   Burgin ................ C08L 23/0815
                                                              525/240

FOREIGN PATENT DOCUMENTS

| EP | 2062937 A1 | 5/2009 |
|---|---|---|
| WO | 9720888 A1 | 6/1997 |
| WO | 2016005301 A1 | 1/2016 |
| WO | 2016070416 A1 | 5/2016 |

OTHER PUBLICATIONS

International Search Report and Written Opinion dated Feb. 11, 2019 (Feb. 11, 2019) for Corresponding PCT/EP2018/080090.

* cited by examiner

*Primary Examiner* — Jeffrey C Mullis

(57) ABSTRACT

A polyolefin composition made from or containing:
T1) 70-95 wt %, of a polyolefin component containing:
a1) from 30 wt % to 70 wt % of a propylene based polymer; and
a2) from 30 wt % to 70 wt % of an ethylene based polymer; and
T2) 5-30 wt % of a polyolefin component containing:
A) 5-35% by weight of a propylene homopolymer or a propylene ethylene copolymer;
B) 25-50% by weight of a copolymer of ethylene and a $C_3$-$C_8$ alpha-olefin containing 0.1-20% by weight of $C_3$-$C_8$ alpha-olefin units; and
C) 30-60% by weight of a copolymer of ethylene and propylene containing 25-75% by weight of ethylene units.

15 Claims, No Drawings

COMPOSITIONS OBTAINED FROM RECYCLED POLYOLEFINS

This application is the U.S. National Phase of PCT International Application PCT/EP2018/080090, filed Nov. 5, 2018, claiming benefit of priority to European Patent Application No. 17201375.7, filed Nov. 13, 2017.

FIELD OF THE INVENTION

In general, the present disclosure relates to the field of chemistry. More specifically, the present disclosure relates to polymer chemistry. In particular, the present disclosure relates to compositions obtained from recycled polyolefins.

BACKGROUND OF THE INVENTION

Polyolefins are consumed for many applications, including packaging for food and other goods, fibers, automotive components, and a variety of manufactured articles. However, the use of polyolefins is causing concern for environmental impact of the waste materials generated after the first use.

Waste plastic materials are coming from differential recovery of municipal plastic wastes, including flexible packaging (cast film, blown film and BOPP film), rigid packaging, blow-molded bottles and injection-molded containers. Through separation from other polymers, such as PVC, PET or PS, two main polyolefinic fractions of polyethylene and polypropylene are obtained.

A problem in polyolefin recycling is separating quantitatively polypropylene (PP) and polyethylene (PE). In some instances, commercial activities to recycle post-consumer waste (PCW) sources yield mixtures of PP and PE, wherein the minor component reaches up to <50 wt %.

In some instances, recycled PP/PE-blends suffer from deteriorated mechanical and optical properties, poor performance in odor and taste, and poor compatibility between the main polymer phases, resulting in limited impact strength and heat deflection resistance.

SUMMARY OF THE INVENTION

In a general embodiment, the present disclosure provides a polyolefin compositions made from or containing:

T1) 70-95 wt %, of a polyolefin component containing:
a1) from 30 wt % to 70 wt % of a propylene based polymer having a propylene content higher than 60 wt % and
a2) from 30 wt % to 70 wt % of an ethylene based polymer having an ethylene content higher than 70;
the sum of the amount of a1) and a2), being referred to the total weight of a1) and a2), being 100; and T2) 5-30 wt % of a polyolefin component containing:
A) 5-35% by weight of a propylene homopolymer or a propylene ethylene copolymer containing 90% by weight or more of propylene units; component A) containing 10% by weight or less of a fraction soluble in xylene at 25° C. ($XS_A$), both the amount of propylene units and of the fraction $XS_A$ being referred to the weight of A);

B) 20-50% by weight; of a copolymer of ethylene and a C3-C8 alpha-olefin containing from 0.1% to 20% by weight of alpha-olefin units and containing 25% by weight or less; of a fraction soluble in xylene at 25° C. ($XS_B$), both the amount of alpha-olefin units and of the fraction $XS_B$ being referred to the weight of (B); and C) 30-60% by weight of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C);

the sum of the amounts of (A), (B) and (C) being referred to the total weight of (A), (B) and (C), being 100;

the sum of the amount of T1) and T2), being referred to the total weight of T1) and T2), being 100.

DETAILED DESCRIPTION OF THE INVENTION

In some embodiments, the present disclosure provides a polyolefin compositions made from or containing:

T1) 70-95 wt %, alternatively 75-90 wt %; alternatively from 77 wt % to 85 wt % of a polyolefin component containing:
a1) from 30 wt % to 70 wt % alternatively from 40 wt % to 60 wt %, alternatively from 45 wt % to 55 wt %, of a propylene based polymer having a propylene content higher than 60 wt %; alternatively higher than 70 wt %; alternatively higher than 80 wt %; alternatively higher than 90 wt %; and a2) from 30 wt % to 70 wt %; alternatively from 40 wt % to 60 wt %; alternatively from 45 wt % to 55 wt %, of an ethylene based polymer having an ethylene content higher than 70; alternatively higher than 75 wt %; alternatively higher than 80 wt %; alternatively higher than 90 wt %;
the sum of the amount of a1) and a2), being referred to the total weight of a1) and a2), being 100; and T2) 5-30 wt %; alternatively 10-25 wt %; alternatively from 15 wt % to 23 wt %; of a polyolefin component containing:

A) 5-35% by weight; alternatively 10-30% by weight; alternatively 15-23% by weight; of a propylene homopolymer containing or a propylene ethylene copolymer containing 90% by weight or more; alternatively 95% by weight or more; alternatively 97% by weight or more; of propylene units; component A) containing 10% by weight or less; alternatively 8 wt % or less; alternatively 6 wt % or less; of a fraction soluble in xylene at 25° C. ($XS_A$), both the amount of propylene units and of the fraction $XS_A$ being referred to the weight of A);

B) 20-50% by weight; alternatively 25-45% by weight; alternatively 30-40% by weight; of a copolymer of ethylene and a $C_3$-$C_8$ alpha-olefin containing from 0.1% to 20% by weight; alternatively from 5% to 15% by weight; alternatively from 7% to 12% by weight; of alpha-olefin units and containing 25% by weight or less; alternatively from 20% by weight or less; alternatively 17% by weight or less; of a fraction soluble in xylene at 25° C. ($XS_B$), both the amount of alpha-olefin units and of the fraction $XS_B$ being referred to the weight of (B); and C) 30-60% by weight; alternatively 35-55% by weight; alternatively 40-50% by weight; of a copolymer of ethylene and propylene containing from 25% to 75% by weight; alternatively from 37% to 65% by weight; alternatively from 45% to 58% by weight; of ethylene units and containing from 40% to 95% by weight of a fraction soluble in xylene at 25° C. ($XS_C$), both the amount of ethylene units and of the fraction $XS_C$ being referred to the weight of (C);

the sum of the amounts of (A), (B) and (C) being referred to the total weight of (A), (B) and (C), being 100;

the sum of the amount of T1) and T2), being referred to the total weight of T1) and T2), being 100;

In some embodiments, the polyolefin composition is used for the production of films, including cast films, blown film, bioriented films, monolayer films, or multilayer films with a reduction of gels number in the films.

In some embodiments, component T1) is a mixture of recycled polypropylene and polyethylene blend.

In some embodiments, component a1) is propylene homopolymer containing from 0 to 5 wt % of comonomers being olefin derived units, alternatively alpha-olefin derived units having from 2 to 10 carbon atoms. In some embodiments, the alpha-olefin derived units having from 2 to 10 carbon atoms are selected from the group consisting of ethylene, 1-butene, 1-hexene and 1-octene derived units. In some embodiments, the alpha-olefin derived units are ethylene derived units. In some embodiments, component a1) is propylene homopolymer.

In some embodiments, component a2) is an ethylene homopolymer or copolymer containing from 0 to 20 wt % of comonomers being olefin derived units, alternatively alpha olefins derived units having from 3 to 10 carbon atoms. In some embodiments, the alpha olefins derived units having from 3 to 10 carbon atoms are selected from the group consisting of propylene, 1-butene, 1-hexene and 1-octene derived units. In some embodiments, the alpha olefins derived units having from 3 to 10 carbon atoms are selected from the group consisting of 1-butene and 1-hexene derived units.

In some embodiments and in the component T2), component (A) has the melt flow rate (230° C./2.16 kg) ranging between 50 and 200 g/10 min; alternatively between 80 and 170 g/10 min.

In some embodiments, components (A)+(B) blended together have the melt flow rate (230° C./2.16 kg) between 0.1 and 70 g/10 min. alternatively between 1 and 50 g/10 min; alternatively between 8 and 40 g/10 min.

In some embodiments, component B) has a density (determined according to ISO 1183 at 23° C.) of from 0.940 to 0.965 g/cm$^3$. Component B) is an ethylene copolymer containing $C_3$-$C_8$ alpha-olefin derived units. In some embodiments, the alpha-olefin comonomers are selected from the group consisting of propylene, 1-butene, 1-pentene, 4-methyl-1-pentene, 1-hexene and 1-octene. In some embodiments, the alpha-olefin comonomers are selected from the group consisting of 1-butene 1-hexene and 1-octene. In some embodiments, the alpha-olefin comonomer is 1-butene.

In some embodiments, the polyolefin composition T2) has a melt flow rate (230° C./2.16 kg) between 0.5 to 25 g/10 min; alternatively from 0.8 to 20.0 g/10 min; alternatively from 1.0 to 18.0 g/10 min.

In some embodiments, the polyolefin composition T2) has an intrinsic viscosity [η] (measured in tetrahydronaphthalene at 135° C.) of the xylene soluble fraction at 25° C. between 1.5 to 4.0 dl/g; alternatively between 2.0 and 3.5 dl/g; alternatively between 2.1 and 2.8 dl/g.

As used herein, the term "copolymer" refers to polymers containing two kinds of comonomers, such as propylene and ethylene or ethylene and 1-butene.

In some embodiments, the polyolefin composition T2) is prepared by a sequential polymerization, including at least three sequential steps, wherein components (A), (B) and (C) are prepared in separate subsequent steps, operating in each step, except the first step, in the presence of the polymer formed and the catalyst used in the preceding step. In some embodiments, the catalyst is added in the first step and retains activity for the subsequent steps.

In some embodiments, the polymerization process is continuous or batch. In some embodiment, the polymerization is carried out in liquid phase, in gas phase, or by mixed liquid-gas techniques. In some embodiments, the polymerization is carried out in the presence of inert diluent. In some embodiments, the polymerization is carried out in gas phase.

In some embodiments, the temperature is from 50 to 100° C. In some embodiments, the pressure is atmospheric or higher.

In some embodiments, the regulation of the molecular weight is carried out by regulators. In some embodiments, the molecular weight regulator is hydrogen.

In some embodiments, the polymerizations are carried out in the presence of a Ziegler-Natta catalyst. In some embodiments, a Ziegler-Natta catalyst is made from or containing the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from compounds of Ti, V, Zr, Cr and Hf. In some embodiments, the transition metal compound is supported on $MgCl_2$.

In some embodiments, the catalysts are made from or contain the product of the reaction of the organometallic compound of group 1, 2 or 13 of the Periodic Table of elements, with a solid catalyst component made from or containing a Ti compound and an electron donor compound supported on $MgCl_2$.

In some embodiments, organometallic compounds are aluminum alkyl compounds.

In some embodiments, the polymer composition B) is obtainable by using a Ziegler-Nana polymerization catalyst, alternatively a Ziegler-Natta catalyst supported on $MgCl_2$, alternatively a Ziegler-Natta catalyst made from or containing the product of reaction of:

1) a solid catalyst component made from or containing a Ti compound and an electron donor (internal electron-donor) supported on $MgCl_2$;

2) an aluminum alkyl compound (cocatalyst); and, optionally, and 3) an electron-donor compound (external electron-donor).

In some embodiments, the solid catalyst component (1) contains, as electron-donor, a compound selected from the group consisting of ethers, ketones, lactones, compounds containing N, P and/or S atoms, and mono- and dicarboxylic acid esters.

In some embodiments, the catalysts are selected from the catalysts described in U.S. Pat. No. 4,399,054 and European Patent No. 45977.

In some embodiments, the electron-donor compounds are selected from the group consisting of phthalic acid esters and succinic acid esters. In some embodiments, the phthalic acid esters is diisobutyl phthalate.

In some embodiments, the succinic acid esters are represented by the formula (I):

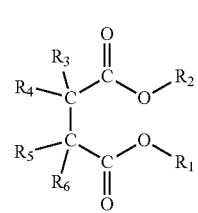

(I)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms. In some embodiments, the radicals $R_3$ to $R_6$, which are joined to the same carbon atom, form a cycle.

In some embodiments, $R_1$ and $R_2$ are selected from the group consisting of $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, the at least two radicals different from hydrogen are linked to different carbon atoms, (a) $R_3$ and $R_5$ or (b) $R_4$ and $R_6$.

In some embodiments, other electron-donors are the 1,3-diethers, described in published European Patent Application Nos. EP-A-361 493 and 728769.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are made from or contain aromatic acid esters, heterocyclic compounds, and silicon compounds containing at least one Si—OR bond (where R is a hydrocarbon radical).

In some embodiments, the aromatic acid esters are alkylic benzoates. In some embodiments, the heterocyclic compounds are selected from the group consisting of 2,2,6,6-tetramethylpiperidine and 2,6-diisopropylpiperidine. In some embodiments, the silicon compounds have the formula $R^1{}_aR^2{}_bSi(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

In some embodiments, the 1,3-diethers are used as external donors. In some embodiments, when the internal donor is a 1,3-diether, the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the operation takes place in liquid monomer, producing a quantity of polymer up to 1000 times the weight of the catalyst.

The following examples are given for illustration without limiting the present disclosure.

EXAMPLES

Characterizations
Xylene-Soluble (XS) Fraction at 25° C.
Solubility in Xylene: Determined as Follows:
2.5 g of polymer and 250 ml of xylene were introduced in a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid were poured in a pre-weighed aluminum container, which was heated on a heating plate under nitrogen flow to remove the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);

XS of components B) and C) have been calculated by using the formula:

$$XS_{tot}=WaXS_A+WbXS_B+WcXS_c$$

wherein Wa, Wb and We are the relative amount of components A, B and C, respectively, and (A+B+C=1).

Melt Flow Rate (MFR)
Measured according to ISO 1133 at 230° C. with a load of 2.16 kg, unless otherwise specified.

Intrinsic Viscosity (IV)
The sample was dissolved in tetrahydronaphthalene at 135° C. and then poured into a capillary viscometer. The viscometer tube (Ubbelohde type) was surrounded by a cylindrical glass jacket, which permitted temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp and the efflux time was registered. The efflux time was converted into a value of intrinsic viscosity through Huggins' equation (Huggins, M. L., J. Am. Chem. Soc., 1942, 64, 2716), based upon the flow time of the solvent at the same experimental conditions (same viscometer and same temperature). A single polymer solution was used to determine [η].

Comonomer ($C_2$ and $C_4$) Content
The content of comonomers was determined by infrared (IR) spectroscopy by collecting the IR spectrum of the sample vs. an air background with a Fourier transform infrared spectrometer (FTIR). The instrument data acquisition parameters were:
purge time: 30 seconds minimum
collect time: 3 minutes minimum
apodization: Happ-Genzel
resolution: 2 cm$^{-1}$.

Sample Preparation—
Using a hydraulic press, a thick sheet was obtained by compression molding about 1 g of sample between two aluminum foil sheets. A small portion was cut from the resulting sheet to mold a film. The film thickness was set to have a maximum absorbance of the $CH_2$ absorption band at ~720 $cm^{-1}$ of 1.3 a.u. (% Transmittance >5%). The molding conditions were carried out at a temperature of about 180±10° C. (356° F.) and a pressure of about 10 $kg/cm^2$ (142.2 psi) for about one minute. The pressure was then released. The sample was removed from the press and cooled to room temperature. The spectrum of the pressed film sample was recorded as a function of absorbance vs. wavenumbers ($cm^{-1}$). The following measurements were used to calculate ethylene ($C_2$) and 1-butene ($C_4$) contents:
a) Area ($A_t$) of the combination absorption bands between 4482 and 3950 $cm^{-1}$, which is used for spectrometric normalization of film thickness.
b) Area ($A_{C2}$) of the absorption band due to methylenic sequences ($CH_2$ rocking vibration) in a range of 660-790 $cm^{-1}$ after a proper digital subtraction of an isotactic polypropylene (IPP) and a $C_2C_4$ references spectrum.
c) The factor of subtraction ($FCR_{C4}$) between the spectrum of the polymer sample and the $C_2C_4$ reference spectrum: The reference spectrum was obtained by performing a digital subtraction of a linear polyethylene from a $C_2C_4$ copolymer to extract the $C_4$ band (ethyl group at ~771 $cm^{-1}$).

The ratio $A_{C2}/A_t$ was calibrated by analyzing reference compositions of ethylene-propylene copolymers, as determined by NMR spectroscopy.

The assignments of the spectra, the evaluation of triad distribution and composition were made according to Kakugo ("Carbon-13 NMR determination of monomer sequence distribution in ethylene-propylene copolymers prepared with δ-titanium trichloride-diethylaluminum chloride," M. Kakugo, Y. Naito, K. Mizunuma and T. Miyatake, *Macromolecules*, 1982, 15, 1150).

To calculate the ethylene ($C_2$) and 1-butene ($C_4$) content, calibration curves were obtained by reference samples of ethylene and 1-butene that were detectable by $^{13}C$ NMR.

Calibration for ethylene—A calibration curve was obtained by plotting $A_{C2}/A_t$ versus ethylene molar percent (% $C_{2m}$), and the coefficients $a_{C2}$, $b_{C2}$ and $c_{C2}$ were then calculated via linear regression.

Calibration for 1-butene—A calibration curve was obtained by plotting $FCR_{C4}/A_t$ versus butane molar percent (% $C_{4m}$), and the coefficients $a_{C4}$, $b_{C4}$ and $c_{C4}$ were then calculated via linear regression.

The spectra of the test samples were recorded and then ($A_t$), ($A_{C2}$) and ($FCR_{C4}$) were calculated.

The ethylene content (% molar fraction $C_{2m}$) of the sample was calculated as follows:

$$\% C2m = -b_{C2} + \frac{\sqrt{b_{C2}^2 - 4 \cdot a_{C2} \cdot \left(c_{C2} - \frac{A_{C2}}{A_t}\right)}}{2 \cdot a_{C2}}$$

The 1-butene content (% molar fraction $C_{4m}$) of the sample was calculated as follows:

$$\% C4m = -b_{C4} + \frac{\sqrt{b_{C4}^2 - 4 \cdot a_{C4} \cdot \left(c_{C4} - \frac{FCR_{C4}}{A_t}\right)}}{2 \cdot a_{C4}}$$

where $a_{C4}$, $b_{C4}$, $c_{C4}$, $a_{C2}$, $b_{C2}$, $c_{C2}$ are the coefficients of the two calibrations.

Changes from mol % to wt % were calculated by using molecular weights of the compound(s).

Amount (wt %) of comonomer of components A-C were calculated by using the following relationship:

$$Com_{tot} = WaCom_A + WbCom_B + WcCom_C$$

wherein Wa, Wb and We are the relative amount of components A, B and C, respectively, and (A+B+C=1).

$Com_{tot}$, $Com_A$, $Com_B$ and $Com_C$ are the amounts of comonomer in the total composition (tot) and in components A-C.

Preparation of Component T2

Catalyst System and Prepolymerization:

Before introducing the solid catalyst component into the polymerization reactors, the solid catalyst component was contacted at 30° C. for 9 minutes with aluminum triethyl (TEAL) and dicyclopentyldimethoxysilane (DCPMS) at a TEAL/DCPMS weight ratio of 15 and the TEAL/solid catalyst component weight ratio of 4.

The catalyst system was then subjected to prepolymerization by maintaining the catalyst system in a liquid propylene suspension at 50° C. for about 75 minutes before introducing the catalyst system into the first polymerization reactor.

Polymerization

The polymerization was carried out in continuous mode in a series of three gas-phase reactors equipped with devices to transfer the product from the first reactor to the second reactor. A propylene-based polymer (A) was produced in the first gas phase polymerization reactor by feeding the prepolymerized catalyst system, hydrogen as the molecular weight regulator, and propylene, with the components being in the gas state, in a continuous and constant flow. The propylene-based polymer (A) coming from the first reactor was discharged in a continuous flow. After being purged of unreacted monomers, the propylene-based polymer (A) was introduced, in a continuous flow, into the second gas phase reactor, together with quantitatively constant flows of hydrogen and ethylene, with the components being in the gas state. In the second reactor a copolymer of ethylene (B) was produced. The product coming from the second reactor was discharged in a continuous flow. After being purged of unreacted monomers, the product was introduced, in a continuous flow, into the third gas phase reactor, together with quantitatively constant flows of hydrogen, ethylene and propylene, with the components being in the gas state. In the third reactor an ethylene-propylene polymer (C) was produced. Polymerization conditions, molar ratio of the reactants and compositions of the resulting copolymers are shown in Table 1. The polymer particles exiting the third reactor were subjected to a steam treatment to remove the reactive monomers and volatile substances and then dried. Thereafter the polymer particles were mixed with a stabilizing additive composition in a twin screw extruder Berstorff ZE 25 (length/diameter ratio of screws: 34) and extruded under a nitrogen atmosphere in the following conditions:

Rotation speed: 250 rpm;
Extruder output: 15 kg/hour;
Melt temperature: 245° C.

The stabilizing additive composition was made from or containing the following components:

0.1% by weight of Irganox® 1010;
0.1% by weight of Irgafos® 168; and
0.04% by weight of DHT-4A (hydrotalcite);

where percentage amounts refer to the total weight of the polymer and stabilizing additive composition.

Irganox® 1010 is 2,2-bis [3-[,5-bis(1,1-dimethylethyl)-4-hydroxyphenyl)-1-oxopropoxy]methyl]-1,3-propanediyl-3, 5-bis(1,1-dimethylethyl)-4-hydroxybenzene-propanoate, and Irgafos® 168 is tris(2,4-di-tert.-butylphenyl)phosphite. The characteristics of the polymer composition, reported in Table 2, were obtained from measurements carried out on the extruded polymer.

TABLE 1

Polymerization conditions

| Example | | 1 |
|---|---|---|
| 1st Reactor – component (A) | | |
| Temperature | °C. | 60 |
| Pressure | barg | 16 |
| $H_2/C_{3-}$ | mol. | 0.24 |
| Split | wt % | 22 |
| Xylene soluble of (A) ($XS_A$) | wt % | 4.2 |
| MFR of (A) | g/10 min | 110 |
| 2nd Reactor – component (B) | | |
| Temperature | °C. | 80 |
| Pressure | barg | 18 |
| $H_2/C_{2-}$ | mol. | 0.81 |
| $C_{4-}/(C_{2-} + C_{4-})$ | mol. | 0.25 |
| $C_{2-}/(C_{2-} + C_{3-})$ | mol. | 0.98 |
| Split | wt % | 32 |
| $C_{2-}$ content of B * | wt % | 90 |
| $C_{4-}$ content of B * | wt % | 10 |
| Xylene soluble of B (XSB) * | wt % | 16.0 |
| Xylene soluble of (A + B) | wt % | 12.0 |
| MFR of (A + B) | g/10 min. | 35.9 |
| 3rd Reactor – component (C) | | |
| Temperature | °C. | 65 |
| Pressure | barg | 18 |
| $H_2/C_{2-}$ | mol. | 0.17 |
| $C_{2-}/(C_{2-} + C_{3-})$ | mol. | 0.42 |
| Split | wt % | 46 |
| $C_{2-}$ content of C * | wt % | 52 |
| Xylene soluble of (C) (XSc)* | wt % | 83 |

Notes: $C_{2-}$ = ethylene (IR); $C_{3-}$ = propylene (IR); $C_{4-}$ = 1-butene (IR); split = amount of polymer produced in the concerned reactor.
* Calculated values.

The features of the polymer of Example 1 are reported in Table 2

TABLE 2

| Example | | 1 |
|---|---|---|
| component A | | |
| $C_2$ content | wt % | 0 |
| XSA | wt % | 4.2 |
| MFR | g/10 min | 110 |
| split | wt % | 22 |
| component B | | |
| XSB* | wt % | 16 |
| $C_2$ content* | wt % | 90.0 |
| $C_4$ content* | wt % | 10.0 |
| split | wt % | 32 |
| MFR of (A + B) | g/10 min | 35.9 |
| Component C | | |
| XSC* | wt % | 83 |
| $C_2$ content* | wt % | 52 |
| split | wt % | 46 |

TABLE 2-continued

| Example | | 1 |
|---|---|---|
| total composition | | |
| MFR | g/10 min | 1.61 |
| IV on soluble in Xylene | dl/g | 2.4 |

$C_2$ = ethylene; $C_4$ = 1-butene;
* calculated

Production of T1 Component

To simulate waste recycled polyolefin composition, a blend of 50 wt % of Hostalen GF 9055 F high density polyethylene, which was commercially available from LyondellBasell, and 50 wt % of Moplen HP561R polypropylene homopolymer, which was commercially available from LyondellBasell, was prepared.

T1 component was blended with various propylene based copolymers. A cast film was obtained with the resulting composition. The compositions and the gel number of the film are reported in Table 3.

TABLE 3

| Ex | | Comp 1 | Ex 2 | Comp 3 | Comp 4 | Comp 5 |
|---|---|---|---|---|---|---|
| T1 | Wt % | 100 | 80 | 80 | 80 | 80 |
| T2: | | | 20 | | | |
| Adflex X500F | Wt % | 0 | | 20 | | |
| Clyrell Rc1890 | Wt % | 0 | | | 20 | |
| Hifax x1956A | Wt % | 0 | | | | 20 |
| Gel number <200 mu | 1/m² | 728 | 48 | 77 | 75 | 851 |

Adflex X500F heterophasic composition is commercially available from LyondellBasell.

Clyrell RC1890 polypropylene random copolymer is commercially available from LyondellBasell.

Hifax X 1956 A heterophasic TPO (thermoplastic polyolefin) polypropylene is commercially available from LyondellBasell.

The gels count test was carried out on a cast film Collin Extrusion line diameter with a 25 mm single screw with the following features:

Single screw L/D 25

Temperature profile

Cylinders 200 (close to the hopper)->230° C. (at the end of the extruder, before the inlet to the die)

Die 240° C.

Die width 150 mm

Chill roll 30° C.

Film speed 3.0 m/min

Film thickness 50 micron

Inspected area 1 m2

OCS FS5 gel count unit on a 4 cm wide stripe

The elongation at break of cast films of examples 1-3 were measured, in machine direction (MD) and transverse direction (TD) according to ASTM D 882, are reported in Table 2.

TABLE 2

|  | Elongation at break MD % | Elongation at break TD % |
|---|---|---|
| Comp ex 1 | 1110 | 7 |
| Ex2 | 1130 | 1000 |
| Comp ex 3 | 1190 | 7 |

What is claimed is:

1. A polyolefin composition comprising:
   T1) 70-95 wt %, of a polyolefin component containing:
   a1) from 30 wt % to 70 wt % of a propylene based polymer having a propylene content higher than 60 wt % and
   a2) from 30 wt % to 70 wt % of an ethylene based polymer having an ethylene content higher than 70; the sum of the amount of a1) and a2), being referred to the total weight of a1) and a2), being 100; and
   T2) 5-30 wt % of a polyolefin component containing:
   A) 5-35% by weight of a propylene homopolymer or a propylene ethylene copolymer containing 90% by weight or more of propylene units;
     component A) containing 10% by weight or less of a fraction soluble in xylene at 25° C. ($XS_A$), both the amount of propylene units and of the fraction $XS_A$ being referred to the weight of A);
   B) 20-50% by weight; of a copolymer of ethylene and a $C_3$-$C_8$ alpha-olefin containing from 0.1% to 20% by weight of alpha-olefin units and containing 25% by weight or less; of a fraction soluble in xylene at 25° C. ($XS_B$), both the amount of alpha-olefin units and of the fraction $XS_B$ being referred to the weight of (B); and
   C) 30-60% by weight of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C);
     the sum of the amounts of (A), (B) and (C) being referred to the total weight of (A), (B) and (C), being 100;
   the sum of the amount of T1) and T2), being referred to the total weight of T1) and T2), being 100.

2. The polyolefin composition according to claim wherein
   Component A ranges from 10% by weight to 30% by weight;
   Component B ranges from 25% by weight to 45% by weight; and
   Component C ranges from 35% by weight to 55% by weight.

3. The polyolefin compositions according to claim 1, wherein
   Component A ranges from 15% by weight to 23% by weight;
   Component B ranges from 30% by weight to 40% by weight; and
   Component C ranges from 40% by weight to 50% by weight.

4. The polyolefin composition according to claim 1, wherein component A) is a polypropylene homopolymer.

5. The polyolefin composition according to claim 1, wherein component B) is a copolymer of ethylene and a $C_3$-$C_8$ alpha-olefin containing from 5% to 15% by weight of alpha-olefin units.

6. The polyolefin composition according to anyone of claim 1, wherein component C) is a copolymer of ethylene and propylene containing from 37% to 65% by weight of ethylene units.

7. The polyolefin composition according to claim 1, wherein component (A) has the melt flow rate (230° C./2.16 kg) ranging between 50 and 200 g/10.

8. The polyolefin composition according to claim 1, wherein components (A)+(B) blended together have the melt flow rate (230° C./2.16 kg) ranging between 0.1 and 70 g/10.

9. The polyolefin composition according to claim 1, wherein the polyolefin composition has a melt flow rate (230° C./2.16 kg) between 0.5 to 25 g/10 min.

10. The polyolefin composition according to anyone of claim 1, wherein component a1) ranges from 45 wt % to 55 wt % and component a2) from 45 wt % to 55 wt %.

11. The polyolefin composition according to claim 1, wherein component T1) is a mixture of recycled polypropylene and polyethylene blend.

12. The polyolefin composition according to anyone of claim 1, wherein component a1) is propylene homopolymer containing from 0 to 5 wt % of comonomers being olefin derived units.

13. The polyolefin composition according to claim 1, wherein a2) is an ethylene homopolymer or copolymer containing from 0 to 20 wt % of comonomers being olefin derived units.

14. A film comprising the polyolefin composition of claim 1.

15. The film according to claim 14 being a cast film, a blown film, a bioriented film, a monolayer film, or a multilayer film.

* * * * *

UNITED STATES PATENT AND TRADEMARK OFFICE
CERTIFICATE OF CORRECTION

PATENT NO. : 11,174,379 B2
APPLICATION NO. : 16/758526
DATED : November 16, 2021
INVENTOR(S) : De Palo et al.

It is certified that error appears in the above-identified patent and that said Letters Patent is hereby corrected as shown below:

On the Title Page

Column 1, Item (30), Line 1, delete "15180032" and insert -- 15180032.3 --, therefor In the Specification In Column 4, Line 29, delete "Ziegler-Nana" and insert -- Ziegler-Natta --, therefor In Column 7, Line 38, delete "ace" and insert -- $a_{c2}$ --, therefor In the Claims In Column 11, Claim 2, Line 46, after "claim" insert -- 1, --

In Column 12, Claim 6, Line 17, after "according to" delete "anyone of"

In Column 12, Claim 10, Line 31, after "according to" delete "anyone of"

In Column 12, Claim 12, Line 37, after "according to" delete "anyone of"

Signed and Sealed this
Thirty-first Day of January, 2023

Katherine Kelly Vidal
*Director of the United States Patent and Trademark Office*